United States Patent [19]
Müntener

[11] Patent Number: 6,047,631
[45] Date of Patent: Apr. 11, 2000

[54] APPARATUS FOR MIXING AND REFINING A CHOCOLATE MASS

[75] Inventor: Kurt Müntener, Bad Salzuflen, Germany

[73] Assignee: Richard Frisse GmbH, Bad Salzuflen, Germany

[21] Appl. No.: 09/300,275

[22] Filed: Apr. 27, 1999

Related U.S. Application Data

[62] Division of application No. 08/921,148, Aug. 29, 1997.

[30] Foreign Application Priority Data

Sep. 12, 1996 [DE] Germany ............................ 196 37 098

[51] Int. Cl.$^7$ ................................ A23G 1/00; A23G 1/06; A23G 1/10; A23G 1/16
[52] U.S. Cl. .................................. 99/348; 99/483; 99/485; 99/486; 366/147; 366/149
[58] Field of Search .............................. 99/485, 486, 348, 99/472, 493, 452, 456–462; 366/83–86, 149, 146, 290, 291, 297–301, 194–196, 154, 155.1, 152.1; 426/231, 519, 660

[56] References Cited

U.S. PATENT DOCUMENTS

| | | |
|---|---|---|
| 5,156,868 | 10/1992 | Muntener et al. ....................... 426/231 |
| 5,351,609 | 10/1994 | Muntener . |
| 5,419,635 | 5/1995 | Schulte et al. . |
| 5,450,786 | 9/1995 | Muntener . |
| 5,810,476 | 9/1998 | Muntener . |
| 5,814,362 | 9/1998 | Muntener . |
| 5,823,673 | 10/1998 | Muntener ............................ 366/149 X |
| 5,911,811 | 6/1999 | Muntener ................................. 99/348 |

FOREIGN PATENT DOCUMENTS 196 36 989   4/1987   Germany .

*Primary Examiner*—Timothy Simone
*Attorney, Agent, or Firm*—Burns, Doane, Swecker & Mathis, LLP

[57] ABSTRACT

An apparatus for processing (for example, mixing or refining) a chocolate mass, having partially cylindrical walls which form a conching vessel. At least one coaxial part extends within the vessel. The walls and the coaxial part perform a relative rotational motion due to a drive that drives either one or both. In this way, the walls are swept by shearing tools. For an increased heat dissipation, and to enable a higher input of energy, at least two tempering arrangements can be provided. Furthermore, a channel exposed to air can communicate with the vessel, and comprises a cleaning tool. Mixing tools and shearing tools can be located in close vicinity so that chocolate mass is fed from one tool to the other.

9 Claims, 8 Drawing Sheets

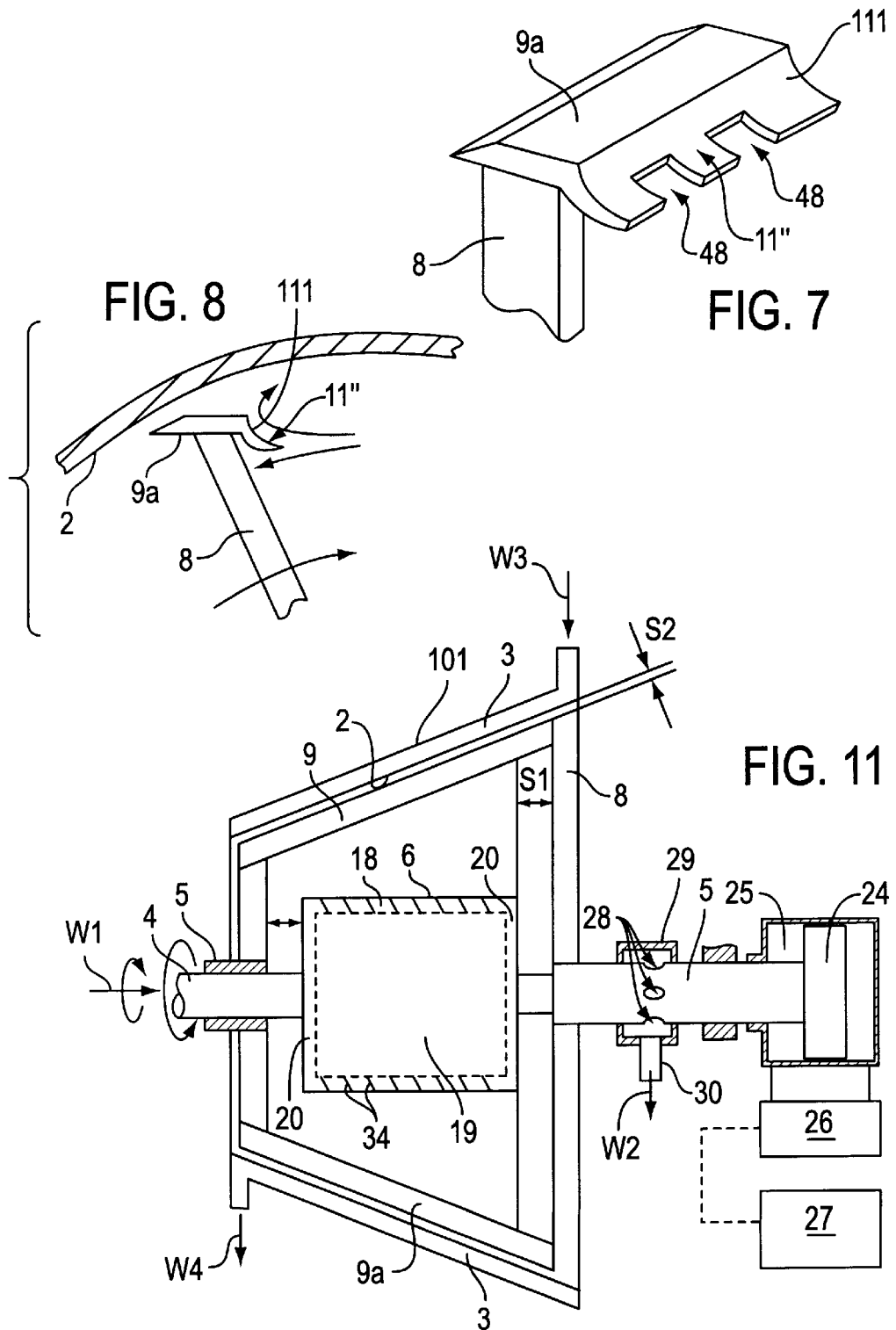

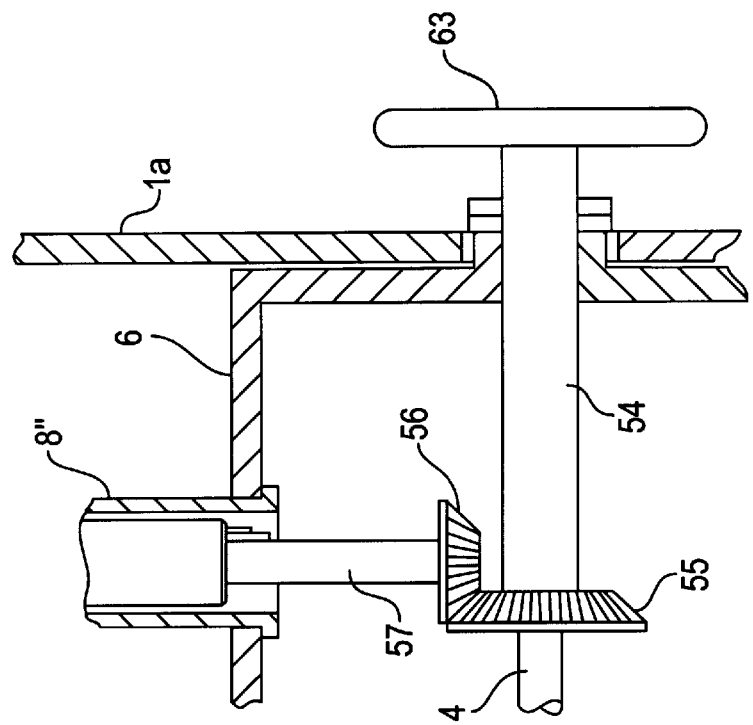
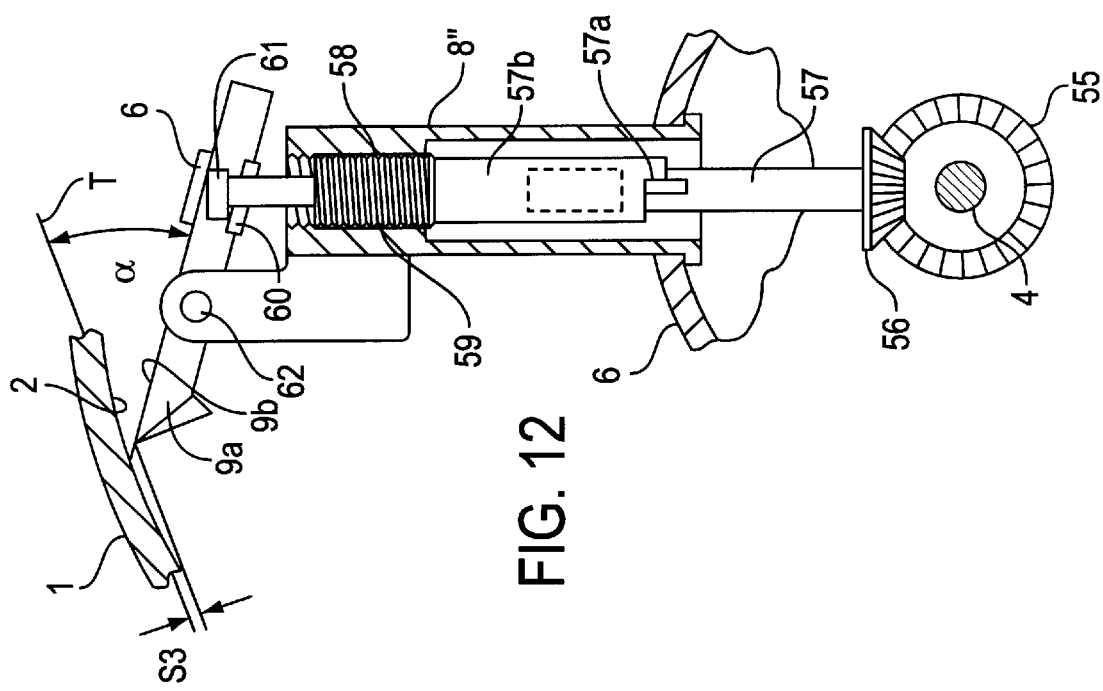

APPARATUS FOR MIXING AND REFINING A CHOCOLATE MASS

This application is a divisional, of application Ser. No. 08/921,148, filed Aug. 29, 1997.

BACKGROUND OF THE INVENTION

1. Field of the Invention

In general, exemplary embodiments of the present invention are directed to machines used for mixing and refining a chocolate mass.

2. State of the Art

Conching machines typically comprise shearing tools extending mainly in radial directions from a rotor arranged in a partially cylindrical trough. These shearing tools have a surface inclined to the trough wall and often end in a relatively sharp edge. In this way, they can act in a double manner; that is, either by shearing chocolate mass off the trough walls when running in one direction, or by providing a rheological shearing effect onto individual layers of the chocolate mass when running in the other direction where the mass is caught in the gap between the trough walls and the converging surface of the shearing tools.

The expenditure for manufacturing such conching machines is considerable, as is their operation. The individual chocolate mass remains in such a conching machine for a long period, while mechanical energy is introduced into the mass to bring it from a more or less dry condition to a pasty condition, and to make it eventually liquid.

Attempts have been made to shorten the conching time and/or to replace conching by other processes, or to simplify the conching process. An increase of introduced energy to shorten the process is, however, not possible to an unlimited extent, because any mechanical energy introduced into the mass converts itself into heat energy, thus heating up the mass. In doing this, there are certain limits not to be exceeded. Heretofore, conching machines were surrounded by an outer tempering jacket (that is, heating and/or cooling jacket). For example, at the beginning of operation, a conching machine often has to be first heated by this jacket to soften the chocolate mass. This jacket provided for heat dissipation during operation but, of course, also had some limits.

SUMMARY OF THE INVENTION

Therefore, it is an object of the present invention to make processing (for example, mixing and refining) of chocolate masses more cost effective by increasing the flow of energy through the material to be treated.

In a first aspect of the invention, this object is achieved by an apparatus for mixing or refining a chocolate mass which comprises a conching vessel, the walls of which are cylindrical at least in part, the vessel further comprising a radial outer jacket for a tempering fluid, wherein heat dissipation is increased by at least one second tempering arrangement.

By providing at least one second tempering arrangement, apart from the radial outer tempering arrangement, (that is, the jacket), heat dissipation is increased, such that a higher energy input per time unit can be supplied into the chocolate mass.

Providing at least one second tempering arrangement can also involve new problems, such as how to accomplish it and where. This can be solved by an apparatus where the second tempering means comprises a second jacket (that is, different from the radial outer jacket). In one embodiment, an apparatus is provided that comprises at least one additional shearing tool for sweeping and shearing over said second jacket. The reason is that cooling a wall results in forming a layer of more or less solidified chocolate mass on this wall, and this layer acts as an isolating material, thus preventing an effective heat dissipation. Heretofore, the tempering circumstances were far simpler in that the shearing tools swept and scratched over the inner wall of the jacket, thus preventing any formation of any chocolate layer.

Another embodiment provides an apparatus moving either the vessel or trough, and/or a coaxial part as a rotor wherein the second tempering arrangement is provided on this rotor. In this case it is particularly useful to provide a scraping or shearing tool that cooperates with the tempered rotor wall.

Another embodiment provides second tempering means including air supply means that open into the vessel or trough for introducing tempering air into the chocolate mass. Such tempering by air has the additional advantage of an intimate contact of the chocolate mass with an oxygen carrier, and of an improved discharge of undesirable smells and taste substances which might be still present from the initial cocoa beans.

According to another aspect of the invention, it should be considered that the higher the input energy, the more will chocolate mass splash out of the vessel or trough. To prevent this, an apparatus for mixing or refining a chocolate mass comprises a conching vessel having a top portion. A channel extends on top of the vessel opening into it and is exposed to air. A cleaning device is movable into the channel in the direction of its longitudinal axis between an inoperative position and an advanced position. Advantageously, this channel can be used to supply the chocolate mass to be treated to the vessel and/or to supply or discharge the tempering air mentioned above.

Now, it has been found that an improved input of energy into the chocolate mass can be achieved by an apparatus wherein the wall means of the vessel are swept by shearing tools, and where mixing tools are also provided. In this case, the shearing and mixing tool means are in close vicinity to each other to guide the chocolate mass from one of said tool means to the other one, thus achieving a more intense treatment. In this way, a synergetic cooperation of the different types of tools is achieved, the mixing tools acting as guide elements for directing chocolate mass to the shearing tools. In such an embodiment, an enhanced stability and strength of the rotor is ensured if the inner rotor that rotates relative to the walls of the vessel carries both types of tools, and the mixing tools extend helically along a periphery of the rotor and the shearing tools. The rotor will be exposed to higher stress due to the increased input of energy. As an alternate, or in addition, the shearing tools can be subdivided into individual sections over the length of the vessel, wherein at least part of said sections have lateral surfaces arranged transversely with respect to the longitudinal axis of the vessel to achieve a mixing effect.

It has been found that a more intense treatment can be achieved by an apparatus which comprises different configurations of shearing tools; that is, first shearing tools which have a shearing edge having a first configurational relationship as to distance, inclination or direction of their shearing edge with respect to said wall means, and second shearing tools having a different configurational relationship thereto. Both types of shearing tools sweep over the walls of the vessel.

According to another aspect of the invention, the intensity of treatment can be adjusted by an apparatus wherein the shearing tools are substantially ledge-shaped so as to face said wall means with one surface under an angle leaving a gap in-between, while extending substantially in longitudinal direction of the vessel. In such an arrangement, an adjusting device for the angle and/or the distance or gap can be provided.

While in the prior art, the treatment of a chocolate mass was substantially effected by tools which extended in radial direction with respect to the longitudinal axis of the vessel or trough, additional energy can be worked into the chocolate mass by the body of the rotor itself. In this case, the vessel and/or the inner coaxial part can have at least one kneading surface.

Another embodiment for intensifying the treatment provides at least two drives for imparting a relative motion (for example, symmetrical rotation about a longitudinal axis) between the vessel and the inner coaxial part when operative. Shearing tools are provided on each of the vessel and the inner coaxial part, and cooperate with each other to exert a rheological shearing force onto the chocolate mass.

BRIEF DESCRIPTION OF THE DRAWINGS

The present invention can be further understood with reference to the following description and the appended drawings, wherein like elements are provided with the same reference numerals. In the drawings:

FIGS. 7 and 8 illustrate a perspective view and a side elevation of an alternate exemplary embodiment of the tool arrangement shown in FIGS. 5 and 6;

FIG. 11 illustrates a further exemplary embodiment in a cross-sectional view corresponding to that of FIGS. 6 and 9; and FIGS. 12 and 13 depict partial cross-sectional views, perpendicular to each other, of an exemplary adjustment device for a shearing or scraping tool.

DETAILED DESCRIPTION OF THE PREFERRED EMBODIMENTS

Figure 1:
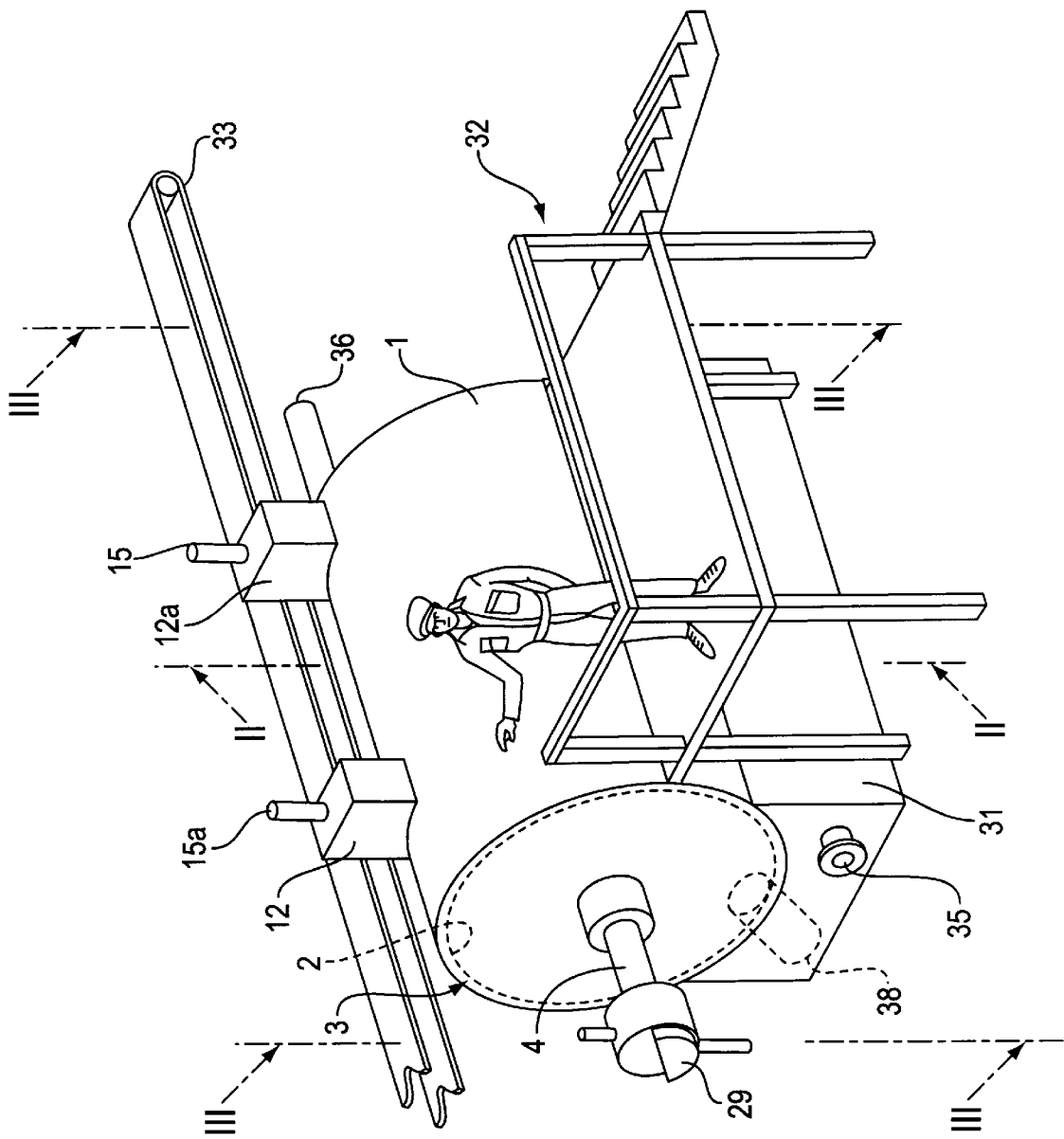
FIG. 1 is a perspective view of an exemplary apparatus according to the invention.

According to FIG. 1, a cylindrical vessel 1 sits on a base 31. The whole vessel can be accommodated within a housing 37 (FIG. 2) of rectangular cross-section. A frame 32 situated beside the vessel 1 provides an access to the top portions of the apparatus. Below the frame 32, a drive motor 39 as well as installation pipes can be accommodated, as may be seen from FIG. 2.

Figure 2:
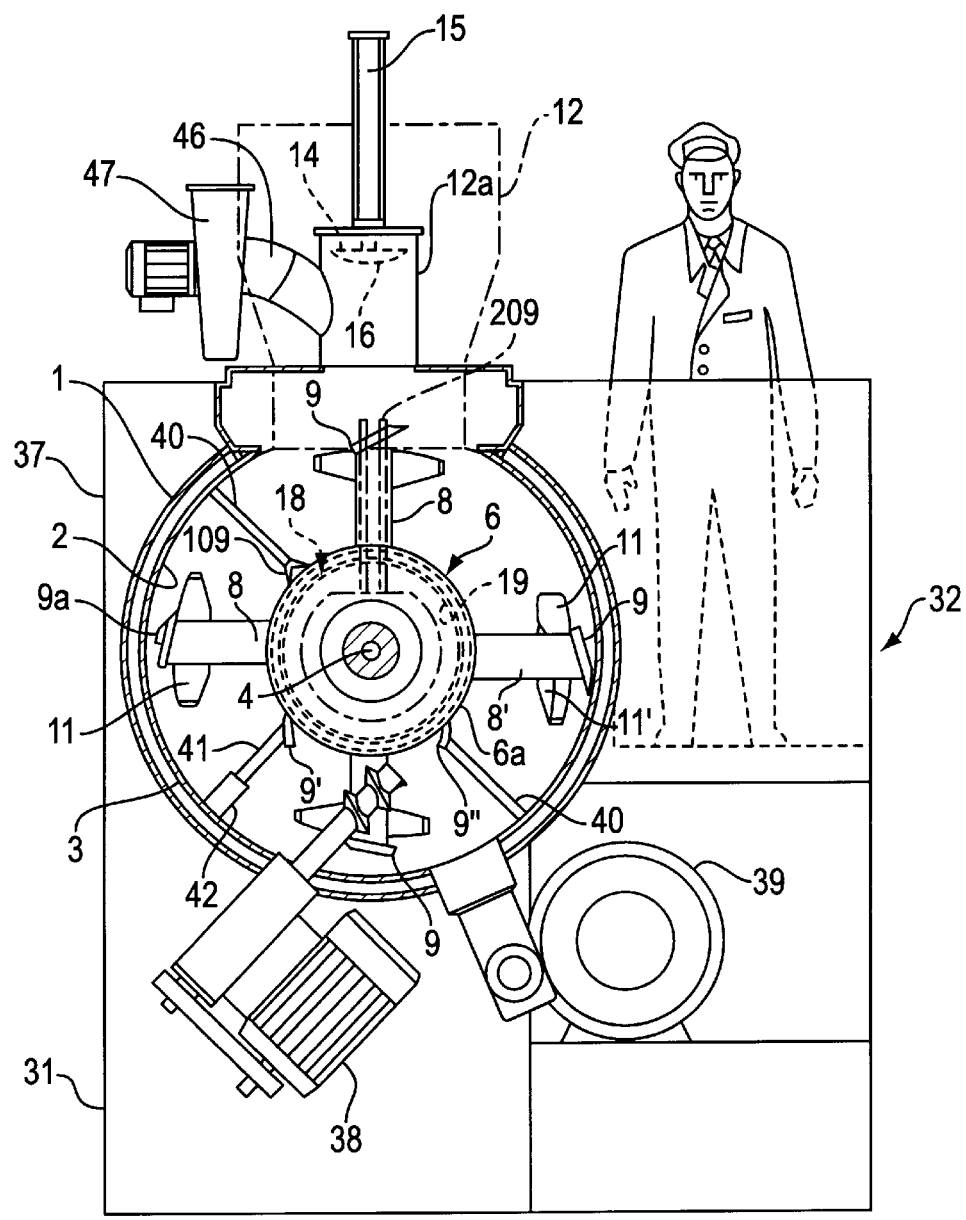
FIG. 2 is a cross-sectional view along the line II—II of FIG. 1.
Figure 3:
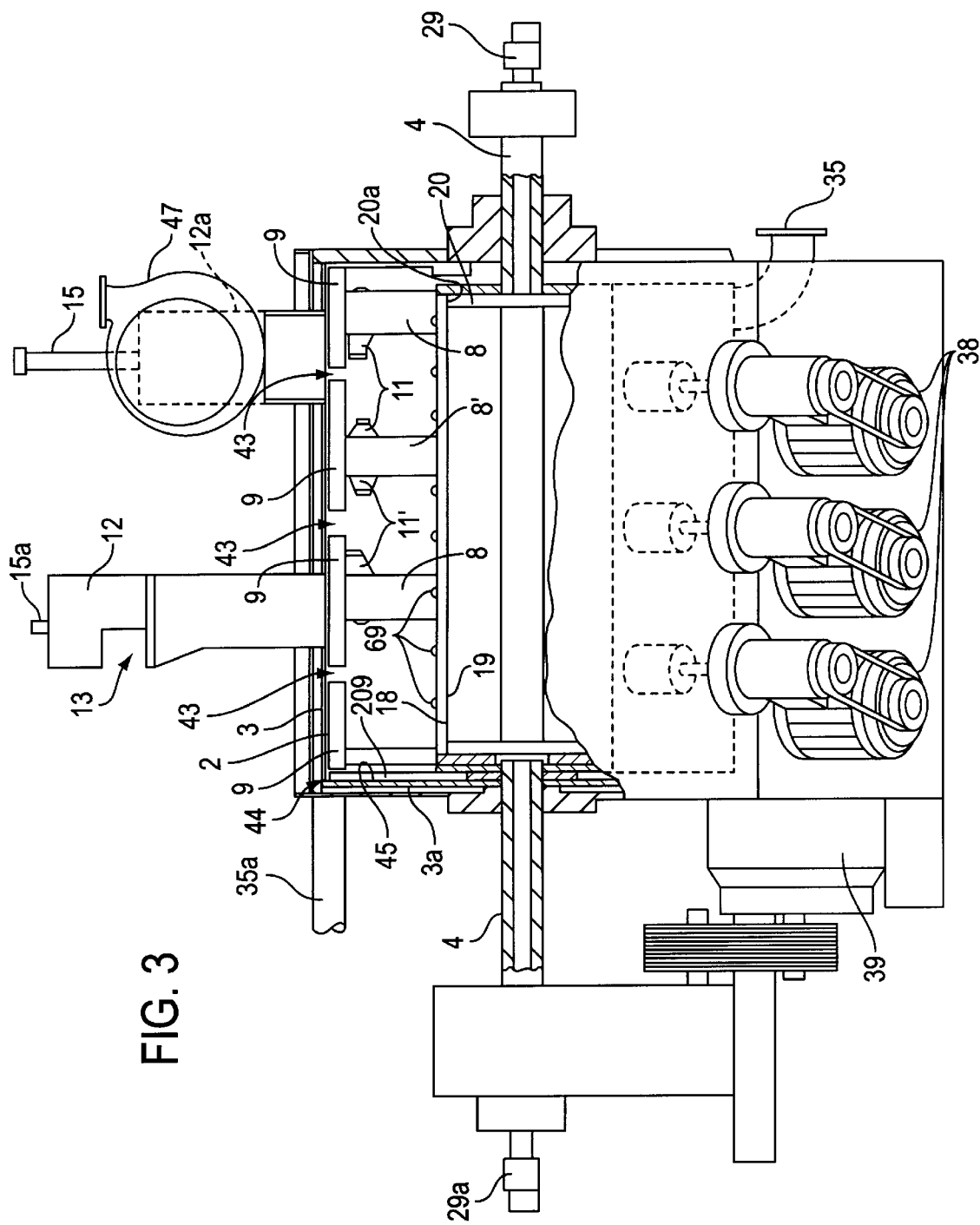
FIG. 3 is a cross-sectional view in the plane III—III of FIG. 1.

The vessel 1 has a filling shaft 12 through which chocolate mass can be filled through a lateral opening 13 not visible in FIG. 1, but shown in FIG. 3. There is a belt conveyor 33 from which the mass can be filled into the opening 13 by means of a stripper or wiper not visible in this view, but known per se. Another shaft 12a can be provided at the other end of the vessel 1 for aerating or venting purposes. Details of the shafts will be described later with reference to FIG. 2; here, it should only be mentioned that the shafts 12, 12a can be closed by fluidically driven sliders, one cylinder unit 36 being visible in FIG. 1.

Moreover, a rotatory or swing joint 29 is provided for introducing a tempering fluid. That is, either a cooling or a heating fluid as needed, at one end of a hollow shaft 4 which is driven by a motor 39 (FIG. 2) at its other end. This shaft 4 drives a rotor provided with tools in the interior of the conching vessel 1. Apart from this rotor, at least one shearing and/or conveying device driven by an additional motor 38 (indicated by broken lines in FIG. 1) and extending at least approximately in radial direction with respect to the longitudinal axis of the vessel 1 serves to treat the mass introduced into the vessel 1, in a manner such as that known from U.S. Pat. No. 5,419,635, the disclosure of which is hereby incorporated by reference in its entirety. The vessel 1 has an inner peripheral jacket wall 2 indicated in broken lines to form a tempering space 3. This space 3 has a pipe connection 35 (for example, an outflow) at one side of the base 31. A supply tube 35a is indicated in FIG. 3.

FIG. 2 illustrates an inner construction of the rotor within the vessel 1 as well as the special structure of the shaft 12a that comprises a cleaning device. A similar cleaning device, as will be discussed with reference to shaft 12a, can optionally be provided for the shaft 12 as indicated by broken lines in FIG. 2.

As shown in FIG. 2, the hollow shaft 4 is connected to a rotor body 6. As indicated by broken lines, the rotor body 6 has an inner core 19 surrounded by an outer jacket 6a. Between the core 19 and the outer jacket 6a, an annular space 18 is provided for supplying a tempering medium, generally a cooling medium. The supply is effected through the rotary joint 29 (FIG. 1) and the hollow shaft in communication therewith, the hollow space of the shaft communicating with this annular space or tempering channel 18.

FIG. 3 illustrates how the hollow shaft 4 communicates with the tempering channel 18 via at least one radial channel 20 (or via a spacing that extends in radial direction) and through an opening 20a. The tempering medium can be air discharged into the chocolate mass in the interior of the vessel 1 through nozzle orifices 69 schematically indicated in FIG. 3. A similar arrangement is described in German Patent Application No. 195 44 415.9, the disclosure of which is incorporated herein by reference. With respect to the construction of the nozzles 69 in detail, reference is made to the aforesaid German Patent Application. In this way, a double effect is achieved; namely, more intense tempering in addition to the known tempering space 3 and the inner wall 2 of the vessel 1 is achieved on the one hand. This inner wall 2 is swept by ledge-shaped shearing or scraping tools 9, 9a. However, cooling (or heating) the chocolate mass by air blown into the vessel is more effective, since the tempering fluid contacts the chocolate mass directly rather than via a wall, as in the case of wall 2. On the other hand, aerating of the chocolate mass, which is, in general, strived for, is enhanced in an exceedingly favorable manner, thus improving its taste and flavor.

It is clear that water can also be introduced through a rotary joint, such as the joint 29, instead of using nozzles 69 and supplying air as a heating and/or cooling medium (that is, tempering medium), wherein all constructions can be employed that are known to be possible for cooling rollers of metal rolling mills, milling rollers and so forth. Evaporating and volatile cooling agents can also be used. Furthermore, it may be seen from FIG. 3 that a rotary joint 29 or 29a can be provided on either end of shaft 4, either to supply cooling medium on one side and to discharge it on the other side, as will be the case in the embodiment shown, or when using a hollow shaft having a central hollow space for transporting the fluid in one direction and forming a concentric annular space by means of a tube inserted into the hollow space where the fluid is transported in the other direction. When using this latter construction, the hollow shaft can have a partition wall in the middle of its length so that streams of tempering medium can be supplied from and discharged on both sides, each way extending over half the hollow shaft 4, as is known from agitator and roller mills.

However, because the application of such a tempering method for chocolate and similar masses is problematic, it has been avoided in the prior art. While tempering according to the prior art using the radial outer tempering space 3 results in partial solidification of the chocolate mass along the wall 2 where this solidified mass is leveled or scraped by the tools 9, 9a, such tools, that would cooperate with the rotor 6 for example, are normally not provided. FIG. 2 illustrates how scraping or shearing tools can be arranged according to an exemplary embodiment of the invention.

In this embodiment, scraper or shearing tools 9', 9" directed against different directions of rotation of the rotor body 6 are provided on a means, such as carrier rods 40, 41 (or shields extending in the rotational direction of the rotor body 6), which protrude from the inner wall 2 and which, in an exemplary embodiment, constitute stationary elongated installations. In this way, scraping off solidified chocolate can be effected even with an inverted direction of rotation of the rotor body 6. In the case of carrier rod 41, this can have assigned still another function by incorporating a temperature sensor 42 into its half directly connected to the wall 2 for measuring a temperature within the vessel (for example, of the vessel interior). However, such carrier rods involve forming interspaces 43 for allowing passage of the carrier rods 40–42 between the ledges of the outer tools 9, 9a. There is another embodiment of a scraper or shearing tool 109 in FIG. 2. In this embodiment, a pivotal tool 109 has two scraping edges in opposite directions on a carrier rod 40. These scraping edges will automatically orient themselves on the outer surface of the rotor body 6 and are suited for the two opposite rotational directions of the rotor body 6.

In order to provide a further tempering facility, the tempering space 3 communicates with a further tempering space 3a in the front wall through an opening 44.

Optionally, the additional tempering space 3a can have a separated supply of tempering fluid (for example, if different temperatures are desired). Here also, the problem can arise that a solidifying layer of chocolate mass would impair the heat transfer from the tempering space 3a to the interior of the vessel 1. Therefore, a further doubleedged shearing tool 209 (for example, trapezoidal in cross-section) is provided on the shaft 4 and has its two edges engaging the front wall 45. In this way, not only any solidified layer that may have formed on the wall 45 is scraped off, but this tool 209 provides an additional rheological shearing effect between individual layers of the mass, thus creating an "ointmentation" effect.

Figure 4:
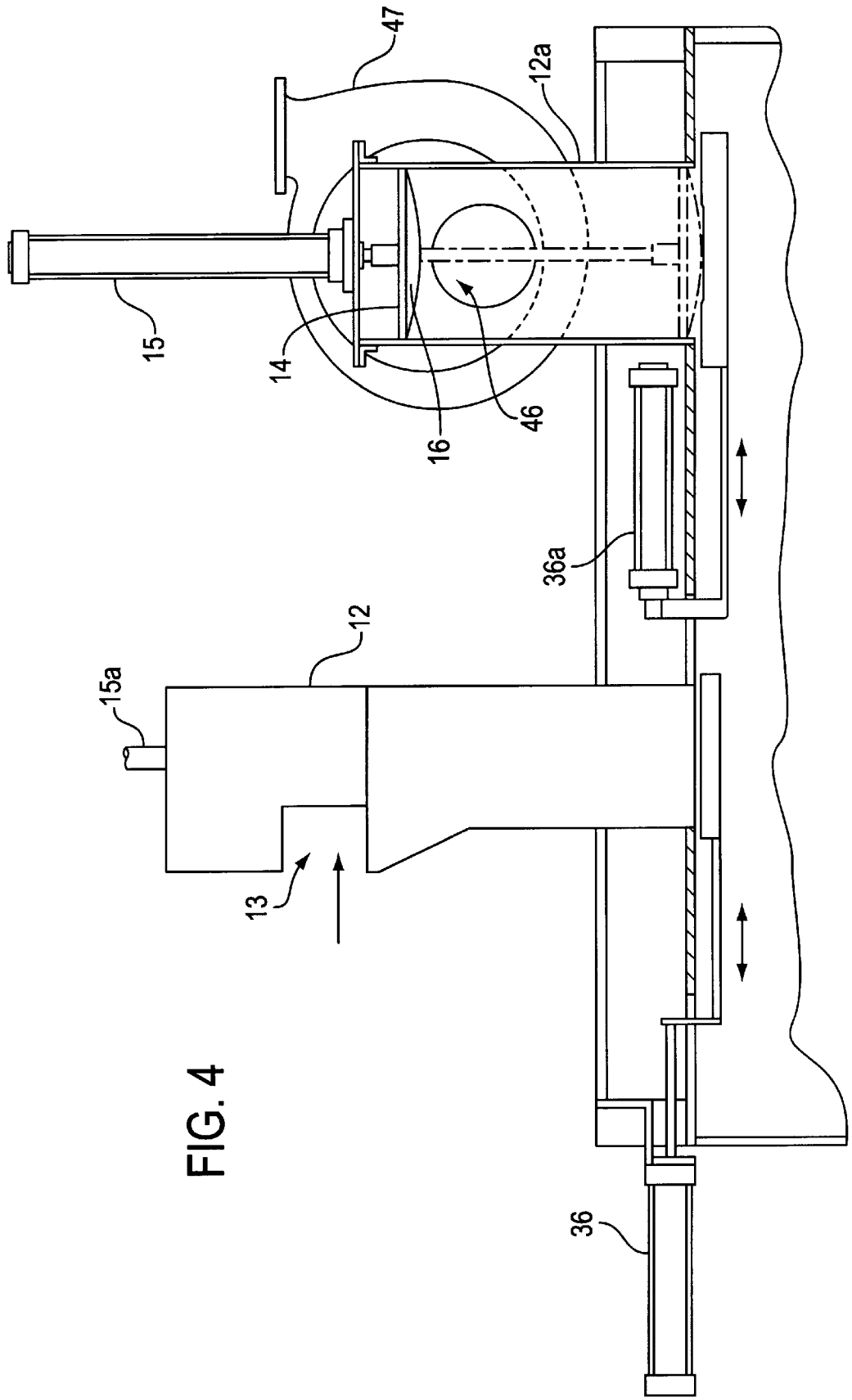
FIG. 4 is an enlarged detail of FIG. 3.

Of course, the supply of an additional material in the form of tempering air into the interior of the conching vessel 1 means an increase of introduced volume which has to be appropriately balanced. This can be done through the shaft 12a, the structure of which is best seen in FIGS. 2 and 4. It should be mentioned, however, that the shaft 12a can also be used to fill the mass into the vessel, if it is, analogously to the construction of the shaft 12, provided with a lateral filling opening 13. In the present embodiment, however, the shaft 12a is a channel forming means which extends along a longitudinal axis and which communicates with a transverse suction channel 46 and a suction fan 47 connected thereto. The shaft 12a can be, for example, rectangular in cross-section or, as in the present embodiment, cylindrical, guiding a shutter piston 14 when moving down into the position shown in dash-dotted lines by means of a spindle drive or a fluid cylinder 15. This has two advantages. On the one hand, the lower surface 16 of the piston 14 can be oriented towards the axis of the vessel 1 in such a manner as to be flush with the inner wall 2 of the vessel 1 when the piston is in its advanced, lowered position. In this way, the shearing or scraping tools 9, 9a will clean this lower surface, whereas the piston 14 itself cleans the interior channel of the shaft 12a from splashed chocolate mass when moving up or down from an inoperative position. The same cleaning device can be provided in the shaft 12 as is indicated by a piston drive cylinder 15a. If desired, the shafts 12, 12a can be closed either fully or only partially (for example, for limiting the air flow in the shaft) by means of shutter sliders actuated by cylinders 36, 36a shown in FIG. 4.

When the chocolate mass has been treated, it is discharged through a discharge device (not shown) in the lower part of the vessel 1 which is, for example, formed analogously to the shaft 12 and its piston 14. The shearing and scraping tools 9, 9a prevent the chocolate mass from adhering to the inner wall 2 and its discharge device. Alternately, a discharge tube for finished chocolate mass, analogous to the pipe connection 35, can be provided.

Returning now to the structure of the tools 9, FIG. 2 shows that the rotor body 6 can have dissimilar tools 9 and 9a on its arms 8, 8'. Namely, if the scraping edges of the tools 9, 9a, which extend obliquely to a tangent to the inner wall 2 (compare FIG. 12), are oriented alternately in forward direction, in relation to a clock-wise rotation, as in the case of the tools 9, and backwards, as in the case of the tools 9a, it will be ensured in either rotational direction of the rotor body 6 that any solidified layer formed on the wall 2 is scraped off so that the cooling (or heating) effect of the tempering arrangement is fully maintained. If only a single direction of rotation is foreseen, the tools 9a acting in the sense of a rheological shearing effect (that is, of a mutual displacement of individual layers of the mass), may be at a greater distance from the inner wall 2, if desired, than the shearing tools 9. Optionally, the distance of the tools 9, 9a can be adjusted, (for example, by a spindle), in an analogous way, as will be described later with reference to FIGS. 12 and 13 for adjusting the angle of the respective tool 9, 9a relative to the tangent to the inner wall 2. It is likewise possible to change the tool's configuration relative to the inner wall 2 by adjusting different angular positions relative to the wall 2 of the shearing or scraping tools 9 or 9a, especially if they have different purposes (rheological shearing and shearing chocolate mass off the wall).

A further particularity of the tool structure includes mixing blades 11, 11' (for example, wing-shaped blades turned transversely with respect to a longitudinal axis of the vessel) arranged in such an immediate vicinity of the shearing and scraping tools 9a and 9 that the chocolate mass can be fed from one of the tools to the other one. This will be described later with reference to FIG. 5, but it should be noted that, in the case of the carrier rod 8', two tools, namely 11 and 11', are arranged thereon (compare, FIG. 3). The tool 11 can, for example, be sickle-shaped forming three angles within the space, as has been suggested in DE-A-195 39 983, the contents of which are hereby incorporated by reference. By the close spatial relationship of the two tools of different purposes, the mass released by the shearing or scraping tools 9 or 9a is immediately seized by the mixing tool 11 or 11'. In this way, an axial and/or radial motion component (for example, the radial motion component is in the case of the sickle-shaped and twisted tool 11') is imparted to the chocolate mass for achieving an improved mixing effect. Mixing can be improved further by sub-dividing the shearing or scraping tools 9 or 9a into individual sections over the length of the cylindrical trough of vessel 1 rather than being ledge-shaped and extending over its entire length. In order to achieve a mixing effect in axial direction, at least part of these sections can have lateral surfaces arranged transversely to the axis of the trough, when seen in circumferential direction, in a manner similar to the mixing tools 11, 11'. However, it is beneficial with such a sub-divided construction of the tools 9 and 9a if the individual sections of the shearing or scraping tools 9, 9a are displaced in the direction of the vessel's longitudinal axis so as to fill gaps when seen over the periphery. In this manner, uniform treatment of the chocolate mass is ensured over the entire length of the vessel 1, thus avoiding dead regions where untreated portions of the mass can accumulate.

Figure 5:
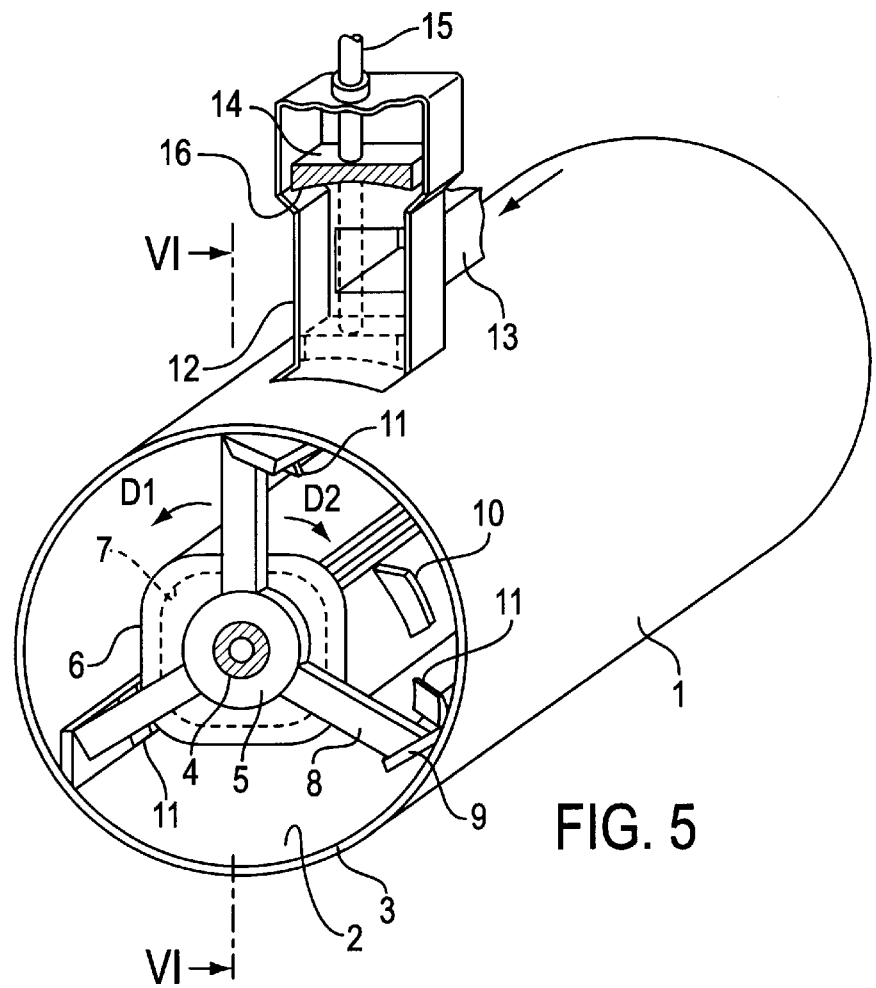
FIG. 5 is an alternate exemplary embodiment.

According to FIG. 5, the cylindrical vessel 1 is shown in a schematical representation together with its inner jacket wall 2 to form a tempering space 3. Coaxially to the cylindrical vessel 1, two shafts are supported, these shafts being formed as hollow shafts 4 and 5. The cavity of the inner shaft 4 serves to supply tempering fluid through the joint 29 (see FIG. 1) into the rotor body 6 formed as a kneading rotor. As is shown in broken lines in FIG. 5, this rotor 6 has a jacket 7 for tempering its surface.

The hollow shaft 5, however, is supported by the shaft 4. As may be seen from arrows D1, D2 of FIG. 5 indicating the rotational direction, one of the shafts rotates in one direction, (for example, clockwise), while the other one rotates in opposite direction (for example, counter-clockwise). In this way, a shearing effect is achieved in the chocolate mass in the vessel 1 between the outer surface of the rotor 6 (which kneads due to its outer surface deviating from a cylindrical shape) and the shearing or scraping tools fixed to the hollow shaft 5 by arms 8. While the cross-sectional shape of the kneading rotor 6 is relatively simple, any shape can be used (for example, a polygonal shape or a helically twisted shape, as is common for kneading rubber in internal mixers).

When the shearing or scraping tools 9 of FIG. 5 rotate in the direction D1, chocolate is scraped off the inner wall 2 of the vessel 1. Simultaneously, the rotor body 6 rotates in an opposite direction to exert a counter-force so that the chocolate mass is not merely dragged as a lump by the tools 9. When the rotational direction of the rotors 6 and arms 8 is inverted (for example, so as to rotate in the direction of arrow D2), a narrowing gap is formed between the surface of the tools facing the vessel's wall 2 and the inner wall 2 itself. This effects an "ointmentation" or rheological shearing (that is, shearing between individual layers of the chocolate mass). This shearing effect is necessary for refining chocolate.

It should be mentioned that, while the inner rotor 6 can be formed as a kneading rotor, its main function resides, in the first place, in generating a counter-force against the chocolate mass moved by the tools 9. However, if the inner rotor 6 is formed as a kneading rotor, it can have a cross-sectional shape of, for example, a rounded square according to the embodiment of FIG. 5. Of course, other shapes are also possible. For example, the inner rotor 6 can be formed as a cylinder, provided with appropriate kneading tools. Kneading tools 10 may be seen from FIGS. 5 and 6 which, however, serve still another purpose in the embodiment shown. Namely, they are arranged inclined with respect to the longitudinal axis of the vessel 1 and the rotor in the manner of a helix, thus conveying chocolate in the direction of arrow F1 of FIG. 6 when the inner rotor 6 rotates in one sense. In this way, the mass is mixed in longitudinal or axial direction of the vessel 1. At the same time, the tools 9 can comprise appropriate conveying blades 11 at their lower or radial inner side, the blades being distributed over the radial inner sides of the tools 9 in an axial direction. In the embodiment of FIG. 5, these blades 11 are relatively short, but in a configuration as may be seen from FIG. 6, blades 11a extend over the whole periphery of the rotor body 6. These blades 11 and 11a convey the chocolate mass in the direction of arrow F2 shown in FIG. 6 (that is, opposite the conveying direction of the kneading tools 10 supported by the inner rotor 6).

Figure 6:
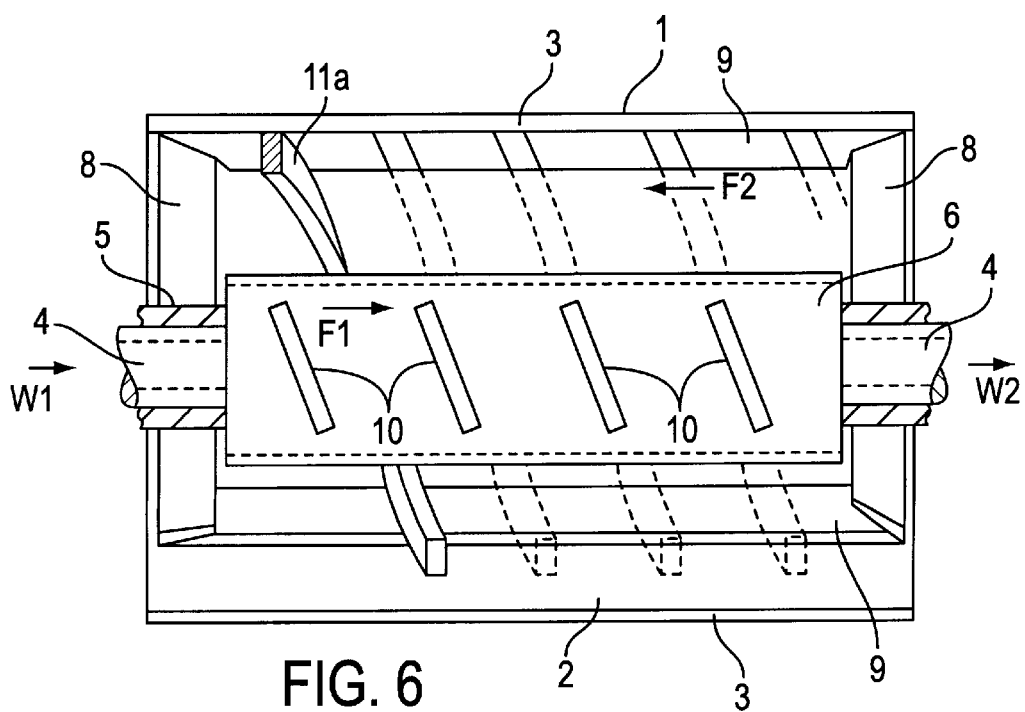
FIG. 6 shows a variant embodiment in a cross-sectional view corresponding to the line VI—VI of FIG. 5.

While in FIG. 6 only one thread of a blade 11a is shown, further threads are schematically indicated. By the blades surrounding the periphery of rotor body 6, two effects are attained; an improvement of the conveying action in the direction of arrow F2 (mixing effect) on the one hand, and on the other hand, the tools 9 and the whole rotor body 6 and arms 8 are stiffened along the periphery. If the rotor 6 is driven on the left side with respect to FIG. 6, the tools 9 will be subjected to twisting strain. This could also be resisted by driving the rotor 6 from the right side which, however, involves additional expenses. In principle, two separate drives can be used for the shafts 4, 5, especially if the rotor 6, arms 8, and tools 9 have different revolutions per time unit. In general, the construction will be such that the outer rotor formed by arms 8 and tools 9 rotates slower than the inner rotor 6. However, a single motor can be used to drive both shafts 4, 5 via a desired gear ratio. Alternately, the two shafts 4, 5 can be interconnected via a differential gear.

In operation of the embodiment shown in FIGS. 5 and 6, the vessel 1 is first charged through the filling shaft 12. The filling shaft 12 is, for example, rectangular in cross-section and is connected to the supply tube 13 of like cross-section or of a cylindrical cross-section. The mass to be treated and refined is charged through the supply tube 13, after which the shutter piston 14 is lowered by a spindle drive 15 into the positions shown in broken lines. This has two advantages. On the one hand, the lower surface 16 of the piston 14 can be oriented to the axis of the vessel 1 in such a manner that it becomes flush with the inner wall 2 of the vessel 1 in the lowered position of the piston 14. Thereby, the shearing tools 9 effect cleaning of this surface, while, on the other hand, the piston 14 itself cleans the interior of the shaft 12 when moving up or down. Nevertheless, it should be mentioned that an air supply can be provided on the piston 14, as it is possible to provide air supply nozzles on the walls of the vessel 1. This air not only aerates the chocolate mass, but also tempers it. Such a tempering measure is more efficient than via the wall 2 of the vessel 1 in that the tempering fluid passes through the mass itself and, thus contacts the mass more intensely. After treatment of the chocolate mass, it is discharged by means of a discharge device (not shown) in the lower part of the vessel 1 which is, for example, formed analogously to the shaft 12 and its piston 14, the shearing and scraping tools 9 preventing the chocolate mass from adhering to the inner wall 2 and its discharge device.

Thus, it is clear that due to double tempering (that is, by the tempering space 3 of the vessel 1, on the one hand, and by the tempered inner rotor 6, for example, on the other hand, the tools of which can also be hollow and have a tempering fluid flowing therein) such an intense cooling (or heat input) is effected that great amounts of heat energy can be dissipated which, in turn, provides an intensive treatment by the mechanical energy introduced via the shafts 4 and 5.

Supply of a tempering medium to the shaft 4 can be effected according to arrow W1 (left side of FIG. 6), and discharge is made in the direction of arrow W2 (right side of FIG. 6) at the other side of the inner rotor 5. Alternately, the supply and the discharge of a tempering medium (for example, cold or hot water) can be provided at the same side, as is known for example, from agitator mills. Likewise, an evaporating cooling medium can be used similar to that used for agitator mills.

An alternate to the tools 9 and 11 of FIGS. 5 and 6 is shown in FIGS. 7 and 8. The advantages of a close vicinity of shearing or scraping tools 9, 9a and mixing tools 11 or 11' have already been pointed out above with reference to FIG. 2. In FIGS. 7 and 8, a comb-like tool 11" is arranged before a shearing tool 9 that suitably has a bent front surface 111. As best seen from FIG. 8 and its arrows showing the flow of chocolate mass, the tool 11" is deviated towards the inner wall of the conching trough when the arm 8 rotates in clockwise direction, thus enhancing the shearing action. By providing comb-like recesses 48 (FIG. 7) in the surface 111, part of the mass passes these recesses (lower arrow in FIG. 8) thereby improving the mixing effect. In this sense, a mutual supplement or synergetic action of the function of the two types of tools 9a and 11" is achieved. Such a synergetic effect can, however, also be in reverse in that the scraping tool 9 (see FIG. 2) scrapes chocolate mass off the inner wall 2 directing it towards the mixing tool 11, 11' or 11" which then distributes the mass supplied in an axial direction of the vessel 1 and of the rotor 6, thus enhancing the mixing effect.

The energy to be introduced can be further increased by additional measures, as will be explained in the following with reference to FIGS. 9 and 10. It can be seen that the vessel 1 is substantially the same as in FIGS. 5 and 6. Likewise, the tools 9 fixed to the arms 8 and the hollow shaft 5 correspond to the previous embodiment. In addition, however, relatively short shearing or scraping tools 9a are located on the hollow shaft 5, preferably cooperating with stator tools 17 extending inwards in radial direction. FIG. 10 illustrates, by way of example, a possible distribution of such stator tools 17 in the lower region of the vessel 1. A very strong shearing effect will result between the tools 9a and 17.

However, FIG. 10 illustrates also that in this embodiment, the cross-section of the inner rotor 106 can, for example, be constructed as a rounded triangle. Within this triangle, an inner peripheral tempering channel 18 is formed between an outer wall and a cylindrical core 19. The tempering channel 18 follows the contour of the core 19, but can also be triangular in cross-section in correspondence with the outer contour of the rotor 106. A tempering medium (such as water) is supplied to the peripheral channel 18 through the hollow shaft 4 and radial channels 20 in a similar way as is known from roller mills. With such an arrangement for cooling or tempering, the outer surface of the core 19 can be provided with helical guiding walls (see 34 in FIG. 11) in order to obtain a forced flow of tempering medium around the periphery of the inner rotor 106 and the core 19. Alternately, tempering channels can be provided that extend parallel to the generatrices of the inner rotor 6 or 106, a plurality of such tempering channels being distributed over the circumference of the rotor, as has also been suggested for cooled milling rollers.

Figure 9:
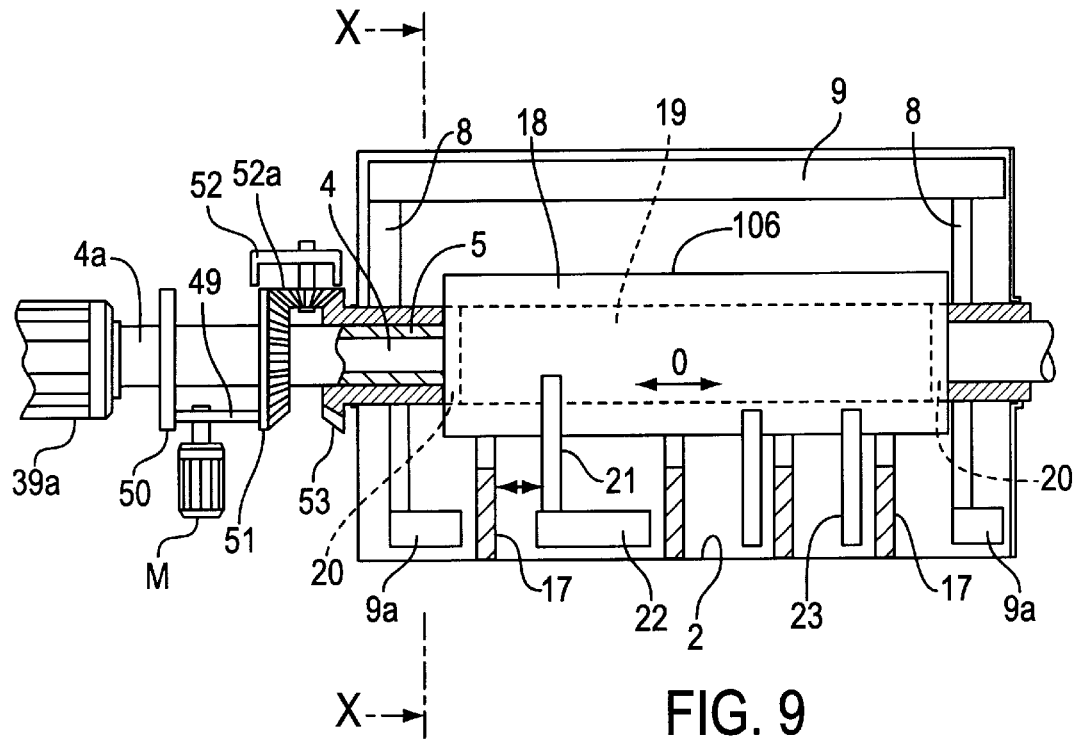
FIG. 9 represents a further exemplary embodiment in a view similar to that of FIG. 6.
Figure 10:
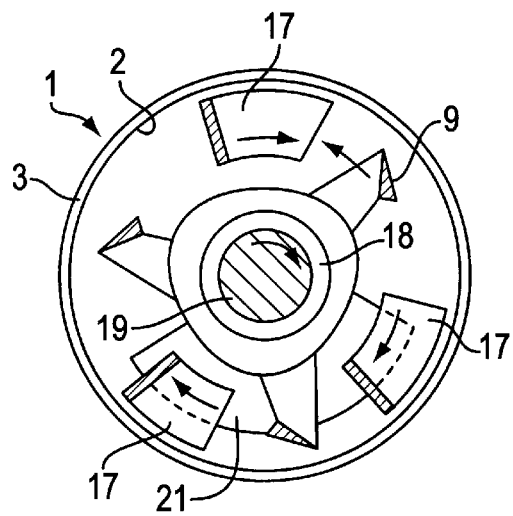
FIG. 10 is a cross-sectional view along the line X—X of FIG. 9.

Outside the inner rotor 106, two different types of tools are provided according to FIG. 9, the tools being either provided together on an individual rotor, as shown, or with only one of them arranged on it.

One of these two types of tools is sector-shaped plates 21 (see FIG. 10) provided with angled protrusions 22 (FIG. 9). The radially projecting plates 21 cooperate with the stator tools 17 to obtain a shearing effect, whereas the protrusions 22 cooperate with the inner wall 2 of the vessel 1 to the same effect; that is, for the purpose of "ointmentation". Accordingly, the protrusions 22 can be formed in a similar way as the tools 9, and the tools 9 and 22 can be configured to cooperate with one another, to converge with respect to the inner wall 2 of the vessel 1.

Instead of the tools 21, 22 (or in addition to them), radial extending blades 23 can also cooperate with the stator tools 17, as is known in liquefing machines. The blades 23 can, if desired, be turned to exert a conveying effect as described above with respect to the tools 10 of FIG. 9. Another measure for increasing shearing energy involves at least the inner rotor 106 (optionally also the rotor 8, 9) being driven by an oscillating (for example, periodic) drive of any known construction to carry out a motion to and fro in the sense of arrow 0 (FIG. 9). This can, for example, be done with a cam or an eccentric 49 arranged between two flanges 50, 51 on a drive shaft 4a (for example, of a motor 39a, which, if desired, can either be connected to the shaft 4 or to a prolongation of it). In this way the shaft 4 is displaced to and fro by a displacement motor M which provides for the motion in the sense of arrow 0 during the rotation of shaft 4a. Such drives are known, for example, for driving thread guides of quick traverse (cross coil) winders in textile industry or in metal rolling mills. It is possible within the scope of the present invention either to displace a single rotor 106 with respect to the vessel 1 in the axial direction, or to provide two rotors displaceable relative to each other.

When moving in the sense of arrow O, a gear box 52, which is schematically indicated and which comprises a bevel gear as an intermediate gear, will also be displaced. This bevel gear transfers the rotation of the flange 51 provided with bevel gear teeth to another bevel gear 53 connected to the shaft 5.

It should be mentioned here that instead of a periodic axial displacement via the cam 49, a mere adjustment in axial direction (for example, a handwheel instead of using a motor M), for adjusting the distance of the tools 17, 22 and 23 can also be used.

Moreover, it should be understood that the gear connection shown is only one example, and various modifications exist. For example, the motor 39a can correspond to the motor 39 of FIGS. 2 and 3 and can be connected to the shaft 4a in the same way via an appropriate gearing. Furthermore, the motor M is not necessary if, instead, a gear connection is provided between the cam 49 and the shaft 4 or 4a. The gear box 52 can also be formed as a part of a differential drive and to rotate it about the axes of the shafts 4 and 5, optionally braking it for control purposes.

Since the cooperation of the tools 9, 9a and 22 with the inner wall 2 of the vessel 1 is based on a relative motion, the vessel 1 can be rotated and can have the inner part 6 or 106 stationary (or also moving, for example, in opposite direction). It is not necessary within the scope of the invention to provide a cylindrical vessel in a narrower sense. FIG. 11 shows a conical vessel (a cylinder in a broader sense) in which a correspondingly formed rotor 8, 9 is driven for rotation by the hollow shaft 5. All the other parts have already been explained with reference to the previous embodiments.

In this embodiment, a gap S1 is formed between the arms 8 and the inner rotor. A plurality of arms 8 can be arranged around the hollow shaft 5 and fixed thereon to provide another shearing effect within the gap S1. This shearing effect can be changed in the same way as in a gap S2 between the tools 9 and the inner wall 2 of the vessel 101. To this end, the shaft 5 of the rotor 8, 9 is extended to the right side (with reference to FIG. 11) and is connected to a plunger 24 within a cylinder 25 of a fluidic displacement means. In FIG. 11, this connection is a direct connection so that the plunger 24 would rotate with the shaft 5, but this direct connection can be interrupted by a clutch or the like (not shown) so that a rotatable connection between the shaft 5 and the plunger 24 is created while in an axial direction the connection is rigid. A control device 26 is assigned to the cylinder 25 for controlling the inlet of a fluid (for example, hydraulic fluid) to one or the other side of the plunger 24 so that the dimensions of gaps S2 and S1 can be changed. The fluidic control device 26, in turn, receives command signals from an electronic control 27. The control devices 26, 27 can be part of a mere adjustment device or can be operated to perform a periodic axial movement of the shaft 5.

In the case of such an axial displacement, it is advantageous if the outer hollow shaft S communicates with the inner space of the hollow shaft 4 through openings 28 so that tempering medium flowing in the direction of arrow W1 can exit through the openings 28 and can enter the rotary joint 29 from which the tempering medium is discharged in the direction of arrow W2 through a discharge pipe 30. In analogous manner, the tempering space 3 is supplied through an inlet W3 for the tempering medium as well as an outlet at W4.

Quite a lot of treatment energy introduced into the chocolate mass is furnished by the shearing and scraping tools 9, 9a, mainly by a Theological shearing. The degree of shearing and the amount of chocolate mass taken into the shearing gap of the tools 9, 9a (according to the rotational direction), which becomes more and more narrow, depends in part on the angle assumed by the surface of the tool 9 or 9a, which faces the inner wall 2, in relation to a tangent on the opposite inner wall 2. Such a tangent may always be drawn to the walls of conching vessels, since its trough (or trough compartment, if two or more trough compartments are parallel to each other instead of a whole cylinder of vessel 1, as is quite typical with conching machines) forms a circular cross-section, at least in part. It has been pointed out above that more mass is drawn into the gap in a combination with the surface 111 (FIGS. 7, 8), thus intensifying the shearing effect.

Instead of a rigid surface 111, the configuration relative to the inner wall 2 can be changed by adjusting either the angle of incidence of the shearing tools 9 or 9a and/or its distance to the inner wall 2 as will be explained below with reference to FIGS. 12 and 13. According to FIGS. 12 and 13, the conching shaft 4 is supported within an adjustment shaft 54, and this, in turn, is supported in a front wall 1a of the conching vessel 1. The adjustment shaft 54 is, for example, connected to a bevel gear 55 engaging another bevel gear 56. This further bevel gear is fixed to a shaft 57 extending in a radial direction relative to the longitudinal axis of the shaft 4. The shaft 57 is supported within a tool arm 8". Connected for common rotation with the radial shaft 57, for example by means of a projection 57a, is another shaft 57b that is displaceable in an axial direction relative to the shaft 57 and that has a thread 58 at its outermost end region screwed into a sleeve 59 fastened within the arm 8" and comprising an inner thread which engages the outer thread 58 of the shaft 57. At the end of the shaft 57b is a coupling element (for example, in the form of a disk 61) inserted between two projections 60, to form a movable connection with the tool 9a.

Because the shearing tool 9a is supported pivotally about a pivot axis 62 rigidly connected to the carrier 8", as is illustrated, rotating a handwheel 63 outside the conching vessel 1 provokes rotating of the bevel gears 55, 56 and of the shafts 57, 57b, and consequently provokes an axial displacement of the shaft 57b by the threaded parts 58, 59. Because the connection comprising the parts 60, 61 is articulated, the tool 9a can then pivot about the pivot axis 62, thus altering the angle alpha assumed by the surface 9b of the tool 9a, which faces the inner wall 2, relative to a tangent onto this inner wall 2 at that location.

In an analogous manner, the distance S3 to the inner wall 2 can be altered, if the configuration relative to the latter is intended to be modified by altering the distance instead of the angle. In this case, a connection between shafts 57b and 57 is provided that is rigid in axial direction, but allowing rotation of the shaft 57b instead of the connection 60, 61 and the pivoting axis 62. In this way, the tool is displaced in a radial direction towards and away from the inner wall 2 of the trough 1 when the two shafts 57, 57b are extended or shortened due to the screw connection 58, 59. It should be understood that, optionally, both measures (that is, pivoting and changing the distance), can be employed, the gearing mechanism shown being, of course, only one of a variety of possibilities.

It will be clear that within the scope of the present invention individual characteristics of an embodiment can be combined with those of another embodiment as well as with features of the prior art. Furthermore it will be understood that various details of the exemplary embodiment described will collectively contribute to a better relationship of energy supplied and dissipated (by cooling), which is an object of the present invention, but that the various details will individually achieve such as an object as well, as is the case, for example, with the adjustment facilities for the tool explained with reference to FIGS. 12 and 13, the arrangement of shearing and mixing tools in close vicinity FIGS. 2–8), and with the axial displacement of the rotor relative to the stator (vessel) according to FIGS. 9–11.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An apparatus for processing a chocolate mass, comprising:

first wall means forming a conching vessel along a longitudinal axis, said vessel having a top portion, and said first wall means being cylindrical at least in part;

at least one coaxial part extending within said vessel;

first shearing tool means operatively located on at least one of said vessel and said coaxial part, said first shearing means having a first shearing edge shape selected with respect to at least one of said first wall means and said at least one coaxial part;

second shearing tool means having a second shearing edge shape, said second shearing edge shape being different from that of said first shearing edge shape; and drive means for imparting a relative motion between said vessel and said coaxial part so that said first wall means are swept by at least one of said first and second shearing tool means.

2. Apparatus as claimed in claim 1, wherein said first shearing tool means have a forward shearing edge when seen in the direction of said relative motion and facing said first wall means, while said second shearing tool means have a rearward looking shearing edge facing said wall means.

3. Apparatus as claimed in claim 1, wherein said first and second shearing tool means are of different distances with respect to said wall means.

4. Apparatus as claimed in claim 1, wherein said first and second shearing tool means form different angles with said wall means.

5. Apparatus as claimed in claim 1, wherein said second shearing tool means is selected to cooperate with respect to said first wall means.

6. Apparatus as claimed in claim 1, wherein said second shearing tool means is selected to cooperate with respect to said at least one coaxial part.

7. Apparatus as claimed in claim 1, wherein said first shearing tool means includes a shearing edge for scraping one of said first wall means and said at least one coaxial part, and said second shearing tool means includes a shearing edge for scraping the other of said first wall means and said at least one coaxial part.

8. Apparatus as claimed in claim 1, wherein said first shearing tool means and said second shearing tool means are selected to cooperate with respect to said first wall means.

9. Apparatus as claimed in claim 1, wherein said first shearing tool means and said second shearing tool means are selected to cooperate with respect to said at least one coaxial part.

* * * * *